United States Patent [19]
Boisvert

[11] Patent Number: 5,846,037
[45] Date of Patent: Dec. 8, 1998

[54] QUICK TOOL RELEASE MECHANISM FOR VERTICAL MILLING MACHINES

[76] Inventor: Marc H. Boisvert, 12 Willowbrae Dr., Peabody, Mass. 01960

[21] Appl. No.: 794,336

[22] Filed: Feb. 3, 1997

[51] Int. Cl.⁶ .............................. B23Q 3/12; B23C 5/26; B23B 31/10
[52] U.S. Cl. ...................................... 409/233; 408/239 A
[58] Field of Search ..................................... 409/233, 231, 409/232, 131, 234; 408/238 A, 239; 279/89; 29/26 A

[56] References Cited

U.S. PATENT DOCUMENTS

| | | |
|---|---|---|
| 2,135,861 | 11/1938 | Thompson . |
| 3,674,281 | 7/1972 | Hedrick . |
| 4,171,821 | 10/1979 | Miller . |
| 4,172,683 | 10/1979 | Shimajiri et al. .................. 409/233 |
| 4,322,190 | 3/1982 | Anderson . |
| 4,398,326 | 8/1983 | Joerger ..................................... 29/26 A |
| 4,480,366 | 11/1984 | Takahashi et al. ...................... 29/26 A |
| 4,743,145 | 5/1988 | Hendricks et al. . |
| 4,768,282 | 9/1988 | Rieck et al. . |

FOREIGN PATENT DOCUMENTS 8910226  11/1989  WIPO .................................... 409/234

*Primary Examiner*—William R. Briggs
*Attorney, Agent, or Firm*—Don Halgren

[57] ABSTRACT

The invention comprises a vertical milling machine having a J-head and a manually adjustable spindle for the rapid change of a tool held in said spindle, including a milling machine head having a motor means for rotatively moving the spindle about its longitudinal axis. An elongated draw bar is rotatively supported within the spindle. A compressive spring is arranged between the top end of the draw bar and the top end of the spindle. An enclosure cap is attached to the head, so as to limit vertical advance of the draw bar, a coupling arranged at the lower end of the draw bar, and a collet with a pull stud thereon, is arranged in mating engagement with the coupling, wherein the collet and a tool therein are released as the spindle is moved longitudinally upwardly with respect to the collet.

12 Claims, 3 Drawing Sheets

QUICK TOOL RELEASE MECHANISM FOR VERTICAL MILLING MACHINES

BACKGROUND OF THE INVENTION

1. Field of the Invention

This invention relates to vertical milling machines and more particularly to, quick release tools to permit those vertical milling machines to be utilized more efficiently.

2. Prior Art

Metal milling machines have been around for many years. One very common one is the Bridgeport type universal standard vertical milling machine. This type of milling machine may be characterized by a vertical spindle, which spindle is manually activated by a handle, to pull a tool towards and push it away from a surface to be worked.

In a Bridgeport type universal milling machine, a collet is utilized to hold a specific tool. The collet is removed and a new collet is put in its place in the spindle, with a new tool in the new collet. The collet provides a machined surface so as to accurately mate with the spindle, thereby maintaining accuracy of the tool during its milling operation. Such a collet may be known under its common name as an "R-8" collet.

In a standard universal Bridgeport type universal milling machine, to release a tool therefrom, a draw bar, which extends through the spindle at the top of the machine head, has to be turned, so as to unscrew the lower end of the draw bar from the existing collet within the lower end of spindle. As the draw bar is unscrewed, the collet is pushed downwardly and the top of the draw bar is given a sudden sharp blow by a heavy object such as a wrench or a hammer. The collet is thus freed from the grip of the lower end of the spindle, and a new collet with a new tool therein, is put into the chuck of the spindle and the new collet is tightened into place by turning the top of the draw bar which turns the lower end of the draw bar into the female portion of the top of the collet. Such an operation can take between one and two minutes to complete in order to successfully change a tool in a vertical milling machine.

There are a number of patents amongst the prior art, which attempt to show arrangements for changing a tool in a milling machine. One such arrangement is shown in U.S. Pat. No. 2,135,861 issued to Thompson. This particular arrangement is for a broaching machine, and would not be utilized with a rotary milling machine inasmuch as it would gall any rotary member utilized therein.

U.S. Pat. No. 3,674,281 issued to Hedrick shows a tool chuck assembly with a spring which is utilized to press a ball against a wire/tool within a tapered cup. The spring however, is not pulling on the tool itself, it is utilized only for wedging engagement of a ball against the tool. U.S. Pat. No. 4,171,821 issued to Miller shows a quick change collet tool holder assembly. A spring however, merely holds the outside of a sleeve in position. This spring is not utilized to locate and position the tool in place. U.S. Pat. No. 4,322,190 issued to Anderson shows a mounting device for machining tools wherein a ball and a bar locking engagement to secure a milling cutter on the end of a spindle nose. U.S. Pat. No. 4,743,145 issued to Hendricks et al. shows a quick change drill chuck system which utilizes a hydraulic system for changing a nose piece of a tool. U.S. Pat. No. 4,768,282 issued to Reick et al., shows a tooling quick release change apparatus for a metal working machine. This arrangement permits the elimination of a draw bar mechanism commonly used in standard metal working machines.

It is the object of the present invention however, to provide a "Bridgeport" type universal vertical milling machine, having a manual tool advance arrangement, with a quick tool change mechanism.

It is yet a further object of the present invention, to provide a quick tool change mechanism which will be readily retrofittable in existing "Bridgeport" type manual universal vertical milling machines.

It is yet still a further object of the present invention, to provide a quick tool release mechanism which will maintain tool accuracy and alignment after changing from one tool to another.

Therefore, it is the object of the present invention, to provide an apparatus for retrofitting existing vertical type milling machines to permit them to have their tools changed in a fraction of the time than it presently takes.

BRIEF SUMMARY OF THE INVENTION

The present invention involves a Bridgeport-type vertical milling machine having a manually adjustable tool feed arrangement thereon. This type of vertical milling machine includes a generally vertically disposed head, which rotatively encloses a vertically arranged spindle. The spindle is rotatively driven by a motor means connected thereto. The spindle comprises an elongated shaft, having a central bore therethrough. The spindle is supported within the head of the machine by a plurality of bearings. An elongated draw bar is arranged through the central bore of the spindle, extending from the uppermost end thereof, to a location adjacent to the lowermost end of the spindle. The spindle is moveable upwardly and downwardly by a rack and pinion arrangement arranged on the side of the head. Up and down movement of the spindle is effected by rotative movement of a quill feed handle attached to the rack and pinion mechanism.

The upper end of the draw bar has a threaded portion thereof. A nut is threadedly attached onto the upper end of the draw bar. A coil spring is arranged between the distal uppermost end of the spindle and the nut, to provide a compressive force therebetween. The nut is adjustably disposed on the threaded portion of the draw bar, so as to adjust the compression in the spring thereadjacent.

A cup shaped enclosure is arranged over the top of the head, so as to enclose the uppermost end of the draw bar and provide an abutting relationship therewith. The lower end of the spindle encloses a collet. The collet is a slender elongated member having a first or a lower end into which a milling tool is secured. The collet has a tapered lower portion which is machined to a high tolerance, for engagement with a corresponding tapered "engaging" lower portion of the spindle. The collet has a gripping head attached thereto at its other, or upper end. The gripping head comprises a generally spherically shaped enlarged engagement portion, having a neck which connects the enlarged portion to a base. The base includes a stud element which is screwed into the first or upper end of the collet. The collet also at its upper end has a second band of closely machined surface, having a high tolerance, to permit intermating with a corresponding high tolerance machined portion of the spindle, so as to permit accurate alignment of a tool therewithin.

A coupling member is threadedly attached to the lowermost end of the draw bar. The coupling member comprises a generally cylindrically shaped body having a lower end with a plurality of ball bearing support orifices therearound. The coupling member also includes an outer sleeve having an innermost surface on its lower end, of stepped diameter. The lowermost end portion of the sleeve has a larger inside diameter and a mid-portion of the outer sleeve has a smaller inside diameter. The outer sleeve mates snugly with and is securely wedged into the innermost portion of the collet/tool holding surface of the lower end of the spindle. The inner housing of the coupling member is longitudinally moveable relative to the outer sleeve of the coupling member. The controlled relative longitudinal movement between the outer member of the coupling member and the inner housing, permits a pair of plurality of balls spaced within the ball socket openings on the inner member, to slip radially outwardly, thus permitting the generally spherically shaped head on the upper end of the collet to be allowed to slip therepast.

In operation of the present vertical milling machine, when it is desired to change a collet and hence change a tool thereon, the machinist moves the quill feed handle to be in its uppermost position. The rotation of the collet end spindle is stopped. The machinist pushes the quill feed handle still further about fifteen degrees upwardly, so as to cause the spindle and draw bar to be pushed upwardly, the uppermost end of the spindle compressing against the compression spring held thereagainst by the nut at the upper end of the draw bar. That is, the draw bar is held stationery against the inside of the cup, and the spindle is moved upwardly to displace the spindle relative to the draw bar. The lower end of the spindle and the outer housing of the coupling wedged therein are also moved relative to the collet and gripping head thereon. The outer housing on the coupling, thus exposes to the balls within the inner housing portion of the coupling, to the larger stepped diameter having a larger open space, permitting those balls to slip radially outwardly from their support position. The balls then move radially outwardly slightly from the neck portion of the gripping member permitting the gripping head on the upper end of the collet (and the collet) to fall there between and allow the collet to be readily removed from the lower alignment surfaces of the spindle. A second collet with a similar enlarged gripping head may be inserted in its place and therefore, a new tool properly aligned within the spindle.

Thus, what has been shown is a quick release arrangement for a manual "Bridgeport" type vertical milling machine which is used to manually advance a tool against a work surface. The present invention uses a spring to force the adjustable nut on the upper end of the draw bar upwardly to hold the draw bar in a locked position to keep the coupling in its locked position. The use of an enlarged head to provide a pull stud which is screwed in to the top of the collet permits standard collets to be readily retrofitted to accommodate the present invention. Thus, the use of a spring member to pull the tool holder collet and tool into a proper precise tool position by virtue of a tapered outside diameter on the collet, now snugly mating with the inside diameter in the spindle, permits precision positioning of a plurality of tools, one after another.

The invention thus comprises a vertical milling machine having a J-head and a manually adjustable spindle for the rapid change of a tool held in said spindle, including a milling machine head having a motor means for rotatively moving said spindle about its longitudinal axis, an elongated draw bar rotatively supported within the spindle, a compressive spring arranged between the top end of the draw bar and the top end of the spindle. An enclosure cap is attached to the head, so as to limit vertical advance of the draw bar. A coupling is arranged at the lower end of the draw bar, and a collet with a pull stud thereon, is arranged in mating engagement with the coupling, wherein the collet and a tool therein are released when the spindle is moved longitudinally upwardly with respect to the collet. The coupling includes an inner housing having a plurality of ball sockets and balls spaced therearound, and an outer sleeve arranged around the inner housing, the sleeve having a stepped inner surface of a first and a second diameter, wherein movement of the sleeve relative to the inner housing moves the inner surface of a first smaller diameter from a position adjacent retaining the balls in the sockets, to a second larger diameter, permitting the balls a looser engagement in the sockets, and a release of the collet from the coupling and draw bar. A nut is adjustably disposed at the upper end of the draw bar, the spring being arranged between the nut and the top of the spindle, wherein adjustment of the nut on the draw bar will adjust the compressibility of the spring. The pull stud on the collet comprises an enlarged spherically shaped head with a narrow neck portion to provide the locus of engaging/pinching of the balls for securing the collet and tool to the draw bar. The pull stud includes a threaded base by which the pull stud is threadedly engaged to the upper end of the collet.

The invention also includes a method of changing a milling tool on a manually operable vertical milling machine having a machine head and a spindle rotatively supported therein, the spindle being movable vertically by a manually adjustable handle connected by a rack and pinion gear arranged therebetween, the method comprising the steps of: arranging a draw bar within the spindle, the draw bar having a threaded upper end, and a coupling arranged at its lower end; pushing the handle so as to cause the draw bar into stopped vertical motion engagement with a rigid cup attached to the upper end of the head of the machine; and moving the spindle with respect to stopped draw bar, so as to permit the coupling to loosen its grip on the collet and tool therewith, thus permitting a new collet and tool to be placed into the coupling. The method includes the steps of attaching a pull stud onto the upper end of the collet to provide a gripping head for the coupling to grasp; placing a nut and a compression spring on the upper end of the draw bar, the spring being arranged between the upper end of the spindle and the nut, to provide a resistive force on excessive vertical advance of the spindle as the draw bar is being pressed against the cup on the head of the machine; and moving a sleeve together with the spindle to expose and release a plurality of balls from engagement in an inner housing portion of the coupling, freeing the coupling from engagement with the collet, to permit a new collet and tool to be engaged with the coupling.

BRIEF DESCRIPTION OF THE DRAWINGS

The objects and advantages of the present invention, will become more apparent, when viewed in conjunction with the following drawings, in which.

DESCRIPTION OF THE PREFERRED EMBODIMENTS

Figure 1:
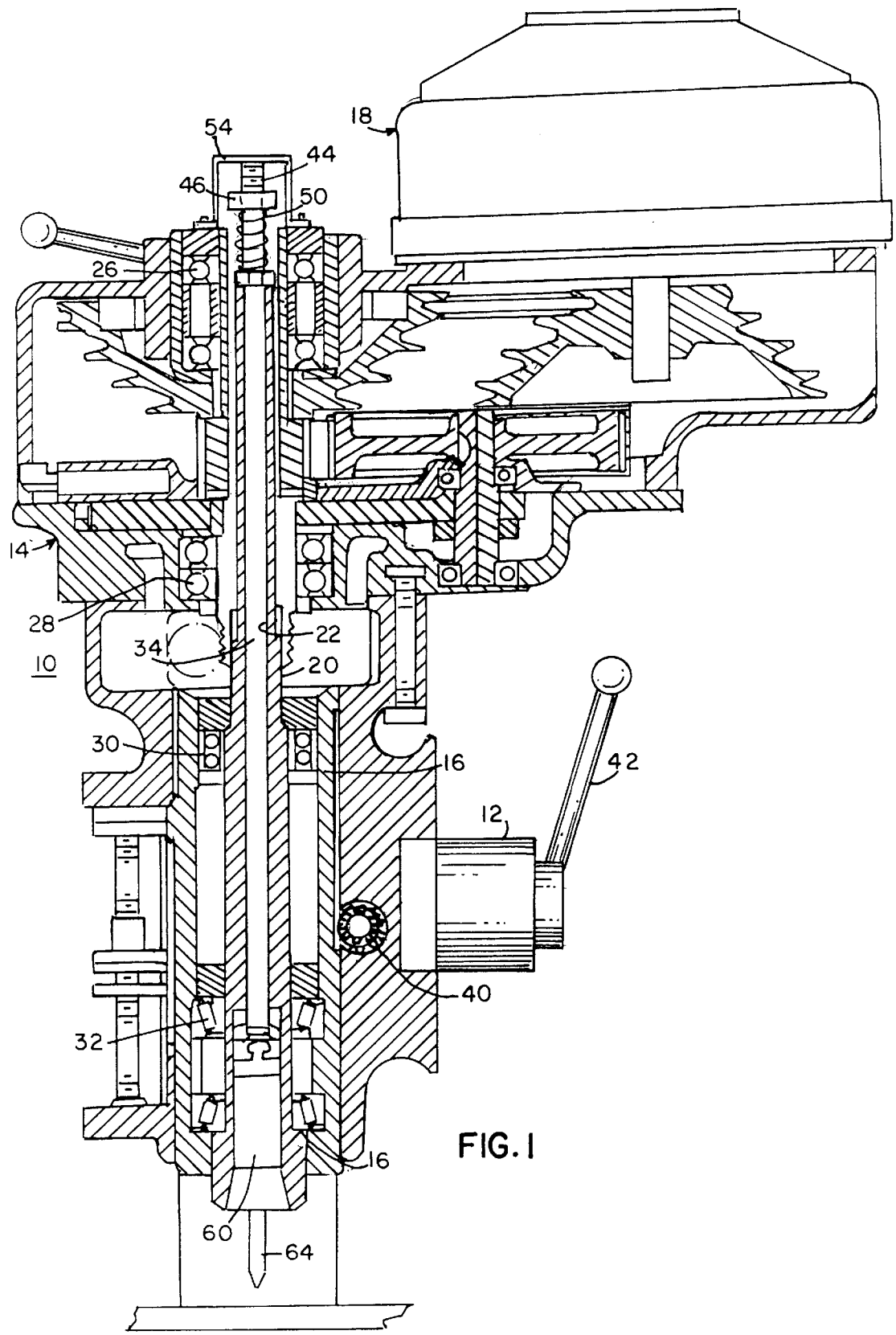
FIG. 1 is a side elevational view in the section, showing a vertical milling machine constructed according to the principles of the present invention.

Referring now to the drawings in detail, and particularly to FIG. 1, there is shown the present invention which comprises a Bridgeport-type vertical milling machine 10 having a manually adjustable tool feed arrangement 12 thereon. This type of vertical milling machine 10 includes a generally vertically disposed head 14, which rotatively encloses a vertically arranged spindle 16. The spindle 16 is rotatively driven by a motor means 18 connected thereto. The spindle 16 comprises an elongated shaft 20, having a central bore 22 therethrough. The spindle 16 is supported within the head 14 of the machine 10 by a plurality of bearings 26, 28, 30 and 32. An elongated draw bar 34 is arranged through the central bore 22 of the spindle 16, extending from the uppermost end thereof, to a location adjacent to the lowermost end of the spindle 16, as may be seen in FIGS. 2 and 3. The spindle 16 is moveable upwardly and downwardly by a rack and pinion gear arrangement 40 arranged on the side of the head 14. Up and down movement of the spindle 16 is effected by rotative movement of a quill feed handle 42 attached to the rack and pinion gear mechanism 40.

The upper end of the draw bar 34 has a threaded portion 44 thereof. A nut 46 is threadedly attached onto the upper threaded end 44 of the draw bar 34. A coil spring 50 is arranged between the distal uppermost end of the spindle 16 and the nut 46, to provide a compressive force therebetween. The nut 46 is adjustably disposed on the threaded portion 44 of the draw bar 34, so as to permit the adjustment of the compression in the spring 50 thereadjacent.

Figure 2:
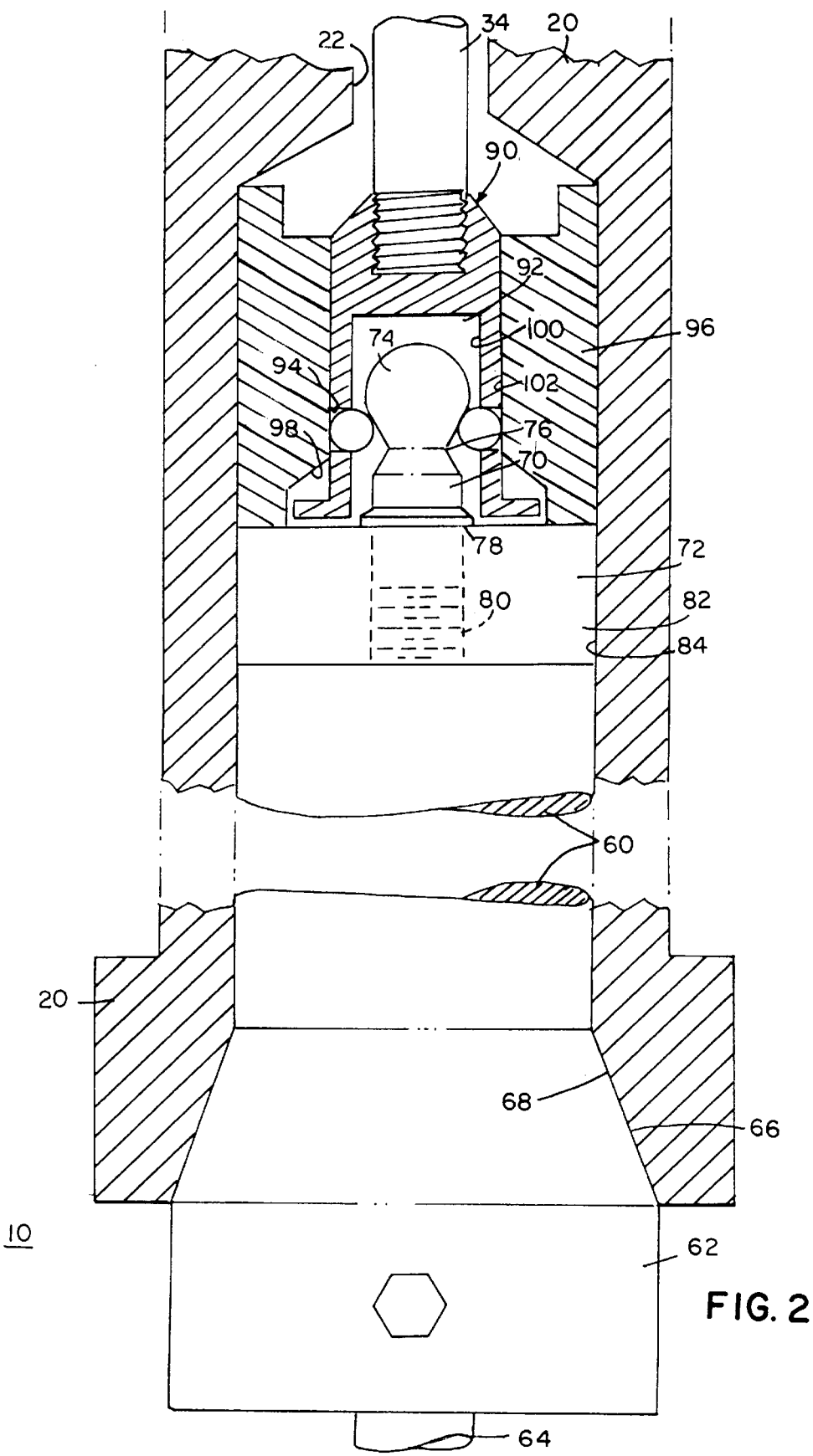
FIG. 2 is an enlarged view of the lower end of the head of the milling machine shown in FIG. 1.
Figure 3:
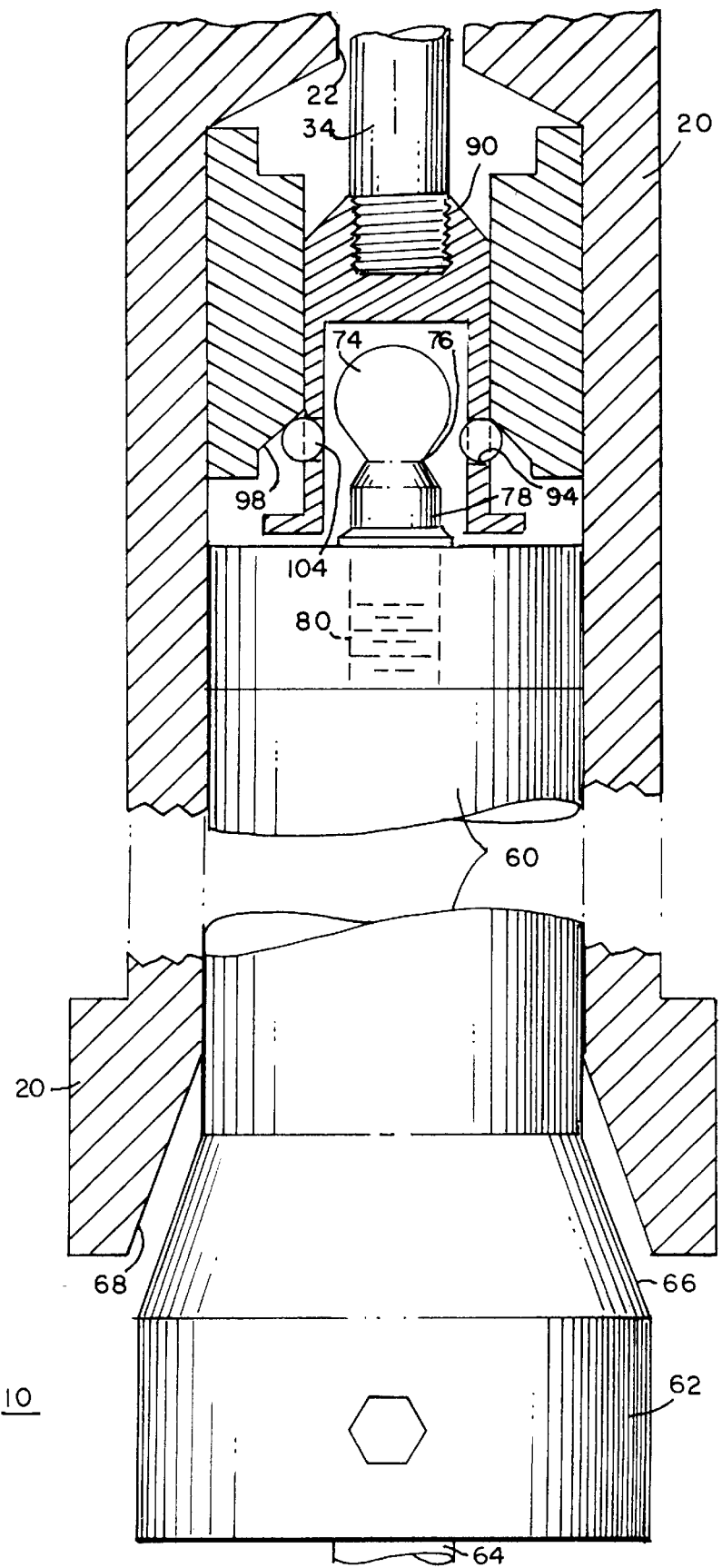
FIG. 3 is a view similar to FIG. 2 showing a subsequent step in the positioning of the components during a tool change operation therewith.

A cup shaped enclosure 54 is arranged over the top of the head 14, so as to enclose the uppermost end of the draw bar 34 and provide an abutting relationship therewith. The lower end of the shaft 20, rotatively held in the lower end of the spindle 16, encloses a collet 60. The collet 60 is a slender elongated member having a first or a lower end 62 into which a milling tool 64, as best shown in FIGS. 2 and 3, is secured. The collet 60 has a tapered lower portion 66 which is machined to a high tolerance, for engagement with a corresponding tapered "engaging" lower portion 68 of the spindle 16. The collet 60 has a gripping head 70 attached to its other, or upper end 72. The gripping head 70 comprises a generally spherically shaped enlarged engagement portion 74, having a neck 76 which connects the enlarged portion 74 to a base 78. The base 78 includes a stud element 80 which is screwed into the first or upper end 72 of the collet 60. The collet 60 also at its upper end has a second band 82 of closely machined surface, having a high tolerance, to permit intermating with a corresponding high tolerance machined portion 84 of the spindle 16, so as to permit accurate alignment of a collet/tool 60/64 therewithin.

A coupling member 90 is threadedly attached to the lowermost end of the draw bar 34. The coupling member 90 comprises a generally cylindrically shaped inner housing body 92 having a lower end with a plurality of ball bearing support sockets 94 therearound. The coupling member 90 also includes an outer sleeve 96 having an innermost surface 98 on its lower end, of stepped diameter. The lowermost end portion of the sleeve 96 has a larger inside diameter and a mid-portion 100 of the outer sleeve 96 has a smaller inside diameter, as may be seen in FIGS. 2 and 3. The outer sleeve 96 mates snugly with and is securely wedged into the innermost portion of the collet/tool holding surface 102 of the lower end of the spindle 16. The inner housing 92 of the coupling member 90 is longitudinally moveable relative to the outer sleeve 96 of the coupling member 90. The controlled relative longitudinal movement between the outer sleeve 96 of the coupling member 90 and the inner housing 92, permits a plurality of balls 104 spaced within the ball socket openings 94 on the inner housing member 92, to slip radially outwardly, thus permitting the generally spherically shaped head 74 secured onto the upper end 72 of the collet 60 to be allowed to slip therepast, as may be seen between FIGS. 2 and 3.

In operation of the present manual vertical milling machine 10, when it is desired to change a collet 60 and hence change a tool 64 thereon, the machinist moves the quill feed handle 42 to be in its generally uppermost position. The rotation of the collet 60 and spindle 16 is stopped. The machinist pushes the quill feed handle 42 still further by about fifteen degrees upwardly, so as to cause the spindle 16 and draw bar 34 to be pushed upwardly, the uppermost end of the spindle 16 compressing against the compression spring 50 held thereagainst by the nut 46 at the upper end of the draw bar 34. That is, the draw bar 34 is held stationery against the inside of the cup 54, and the spindle 16 is still moved upwardly slightly, to displace the spindle 16 relative to the draw bar 34. The lower end of the spindle 16 together with the outer sleeve 96 of the coupling member 90 wedged therein are also moved relative to the collet 60 and the gripping head 74 thereon. The outer sleeve 96 on the coupling member 90 thus exposes to the balls 104 within the inner housing 92 of the coupling 90, to the larger stepped diameter 98 having a larger open space, permitting those balls 104 to slip radially outwardly from their support position. The balls 104 then move radially outwardly slightly from engaging/pinching the neck portion 76 of the gripping head 74 permitting the gripping head 74 on the upper end 70 of the collet 60 (and the collet) to fall therebetween and allow the collet 60 to be readily removed from the lower alignment surfaces 68 and 102 of the spindle 16. A second collet with a similar enlarged gripping head may be inserted in its place and therefore, a new tool properly aligned within the spindle.

Thus, what has been shown is a quick release arrangement for a manual "Bridgeport" type vertical milling machine which is used to manually advance a tool against a work surface. The present invention uses a spring to force the adjustable nut on the upper end of the draw bar upwardly to hold the draw bar in a locked position to keep the coupling in its locked position. The use of an enlarged head to provide a pull stud which is screwed in to the top of the collet permits standard collets to be readily retrofitted to accommodate the present invention. Thus, the use of a spring member to pull the tool holder collet and tool into a proper precise tool position by virtue of a tapered outside diameter on the collet, now snugly mating with the inside diameter in the spindle, permits precision positioning of a plurality of tools, one after another.

I claim:

1. A vertical milling machine having a J-head and a manually adjustable spindle for the rapid change of a tool held in said spindle, comprising:

a milling machine head having a motor means for rotatively moving said spindle about its longitudinal axis;

an elongated draw bar rotatively supported within said spindle;

a compressive spring arranged between the top end of said draw bar and the top end of said spindle;

a draw bar movement-stopping enclosure cap attached to said head, so as to limit vertical advance of said draw bar;

a coupling arranged at the lower end of said draw bar; and a collet with a pull stud thereon, arranged in mating engagement with said coupling, wherein said collet and a tool therein are released when said spindle is moved longitudinally upwardly with respect to said collet upon said draw bar engaging said cap.

2. The vertical milling machine as recited in claim 1, wherein said coupling includes an inner housing having a plurality of ball sockets and balls spaced therearound, and an outer sleeve arranged around said inner housing, said sleeve having a stepped inner surface of a first and a second diameter, wherein movement of said sleeve relative to said inner housing moves said inner surface of a first smaller diameter from a position adjacent retaining said balls in said sockets, to a second larger diameter, permitting said balls a looser engagement in said sockets, and a release of said collet from said coupling and draw bar.

3. The vertical milling machine as recited in claim 2, including a nut adjustable disposed at the upper end of aid draw bar, said spring being arranged between said nut and said top of said spindle, wherein adjustment of said nut on said draw bar will adjust the compressibility of said spring.

4. The vertical milling machine as recited in claim 3, wherein said pull stud on said collet comprises an enlarged spherically shaped head with a narrow neck portion to provide the locus of engaging/pinching of said balls for securing said collet and tool to said draw bar.

5. The vertical milling machine as recited in claim 4, wherein said pull stud includes a threaded base by which said pull stud is threadedly engaged to the upper end of said collet.

6. A method of changing a milling tool on a manually operable vertical milling machine having a machine head and a spindle rotatively supported therein, said spindle being movable vertically by a manually adjustable handle connected by a rack and pinion gear arranged therebetween, comprising the steps of:

arranging a draw bar within said spindle in said head, said draw bar having a threaded upper end, and a coupling arranged at its lower end;

pushing said handle so as to cause said draw bar into stopped vertical motion engagement with a rigid cup attached to the upper end of said head above said draw bar; and moving said spindle with respect to stopped draw bar, so as to permit said coupling to loosen its grip on said collet and tool therewith, thus permitting a new collet and tool to be placed into said coupling.

7. The method of claim 6, including the step of:

attaching a pull stud onto the upper end of said collet to provide a gripping head for said coupling to grasp.

8. The method of claim 7, including the step of:

placing a nut and a compression spring on said upper end of said draw bar, said spring being arranged between the upper end of said spindle and said nut, to provide a resistive force on excessive vertical advance of said spindle as said draw bar is being pressed against said cup on said head of said machine.

9. The method of claim 8, including the step of:

moving a sleeve together with said spindle to expose and release a plurality of balls from engagement in an inner housing portion of said coupling, freeing said coupling from engagement with said collet, to permit a new collet and tool to be engaged with said coupling.

10. A collet for a vertical milling machine having a J-head and a manually adjustable spindle for the rapid change of a tool held in said spindle, said milling machine head having a motor means for rotatively moving said spindle about its longitudinal axis; an elongated draw bar rotatively supported within said spindle; a compressive spring arranged between the top end of said draw bar and the top end of said spindle; an enclosure cap attached to said head above said draw bar, so as to limit vertical advance of said draw bar and release said collet; a coupling arranged at the lower end of said draw bar, wherein said collet includes:

a pull stud thereon, arranged in mating engagement with said coupling, wherein said collet and a tool therein are released when said spindle is moved longitudinally upwardly with respect to said collet.

11. The collet as recited in claim 10, wherein said pull stud comprises a spherical head portion and a neck portion of reduced diameter, said neck portion being engagable by said coupling to secure said collet to said draw bar.

12. The collet as recited in claim 11, wherein said pull stud has a threaded base which is threadably engagable with the upper end of said collet.

* * * * *